(12) United States Patent
Guzzella et al.

(10) Patent No.: US 8,136,512 B2
(45) Date of Patent: *Mar. 20, 2012

(54) METHOD FOR OPERATING AN ENGINE WITH A PRESSURE-WAVE SUPERCHARGER

(75) Inventors: Lino Guzzella, Wallisellen (CH);
Christopher Onder, Weisslingen (CH);
Martin Rauscher, Ludwigsburg (DE);
Peter Spring, Reutigen (CH)

(73) Assignee: Robert Bosch GmbH, Stuttgart (DE)

( * ) Notice: Subject to any disclaimer, the term of this patent is extended or adjusted under 35 U.S.C. 154(b) by 43 days.

This patent is subject to a terminal disclaimer.

(21) Appl. No.: 12/657,117

(22) Filed: Jan. 13, 2010

(65) Prior Publication Data
US 2010/0206273 A1    Aug. 19, 2010

Related U.S. Application Data

(63) Continuation of application No. 11/800,153, filed on May 3, 2007, now Pat. No. 7,669,587.

(30) Foreign Application Priority Data

May 3, 2006 (DE) .......................... 10 2006 020 522

(51) Int. Cl.
*F02B 33/00* (2006.01)
*F02B 33/44* (2006.01)
*F02C 3/02* (2006.01)

(52) U.S. Cl. ........ 123/559.2; 60/39.45; 60/597; 60/598; 417/64

(58) Field of Classification Search ............... 123/559.2; 60/39.45, 597, 598; 417/64
See application file for complete search history.

(56) References Cited

U.S. PATENT DOCUMENTS

| | | | |
|---|---|---|---|
| 3,120,920 A | 2/1964 | Waleffe et al. | |
| 4,517,950 A | 5/1985 | Mayer et al. | |
| 4,553,387 A | 11/1985 | Mayer | |
| 4,646,704 A | 3/1987 | Gora et al. | |
| 4,662,342 A | 5/1987 | Altmann et al. | |
| 4,798,049 A | 1/1989 | Mayer | |
| 4,838,234 A | 6/1989 | Mayer | |
| 4,859,153 A | 8/1989 | Mayer | |
| 5,052,362 A | 10/1991 | Jenny et al. | |
| 5,267,432 A | 12/1993 | Paxson | |
| 5,724,949 A | 3/1998 | Liang | |
| 5,839,416 A | 11/1998 | Kruiswyk et al. | |
| 6,082,341 A | 7/2000 | Arai et al. | |
| 6,089,211 A | 7/2000 | Wenger | |
| 6,439,209 B1 | 8/2002 | Wenger et al. | |
| 6,988,493 B2* | 1/2006 | Wenger et al. ............. | 123/559.2 |

(Continued)

FOREIGN PATENT DOCUMENTS

DE    35 03 071    1/1986

(Continued)

OTHER PUBLICATIONS

MTZ ("Daz SAVE-Motorkonzept") 59(1998), pp. 644-650.

*Primary Examiner* — Mary A Davis
(74) *Attorney, Agent, or Firm* — Kenyon & Kenyon LLP

(57) ABSTRACT

In an internal combustion engine, fresh air is compressed by a pressure-wave supercharger. At least one operating parameter of the pressure-wave supercharger is controlled or regulated as a function of at least one actual operating variable of the internal combustion engine.

3 Claims, 5 Drawing Sheets

U.S. PATENT DOCUMENTS

| | | |
|---|---|---|
| 7,155,334 B1 | 12/2006 | Stewart et al. |
| 7,669,587 B2 * | 3/2010 | Guzzella et al. ........... 123/559.2 |
| 7,815,421 B2 * | 10/2010 | Bross et al. ..................... 417/64 |
| 2003/0226353 A1 | 12/2003 | Wenger et al. |
| 2004/0003802 A1 | 1/2004 | Wenger et al. |

FOREIGN PATENT DOCUMENTS

| | | |
|---|---|---|
| DE | 37 28 189 | 3/1988 |
| DE | 38 30 058 | 2/1989 |
| DE | 39 22 491 | 3/1990 |
| DE | 197 03 522 | 3/1998 |
| EP | 1 375 859 | 5/2003 |
| ER | 1 375 858 | 6/2002 |
| JP | 60150427 A | 8/1985 |
| JP | 62055418 A | 3/1987 |

\* cited by examiner

METHOD FOR OPERATING AN ENGINE WITH A PRESSURE-WAVE SUPERCHARGER

CROSS-REFERENCE TO RELATED APPLICATIONS

This application is a continuation of U.S. patent application Ser. No. 11/800,153 filed on May 3, 2007, now U.S. Pat. No. 7,669,587 and which claims priority to German Patent Application No. 10 2006 020 522.7, filed on May 3, 2006, all of which are hereby incorporated by reference in their entirety.

FIELD OF THE INVENTION

The present invention relates to a method for operating an internal combustion engine, a computer program, an electrical storage medium as well as a control and/or regulating device for an internal combustion engine.

BACKGROUND INFORMATION

The journal MTZ ("Motortechnische Zeitschrift") 95(1998), page 466 ff., describes a vehicle having a pressure-wave supercharger. Additional documents referring to pressure-wave superchargers are, for example, German Published Patent Application No. 35 03 071, German Published Patent Application No. 38 30 058, German Published Patent Application No. 37 28 189, German Published Patent Application No. 39 22 491 and German Published Patent Application No. 197 03 522.

SUMMARY

Example embodiments of the present invention provide for and increase the range of application of pressure-wave superchargers in internal combustion engines. In particular, the emission behavior and the responsiveness of an internal combustion engine is supposed to be improved using a pressure-wave supercharger.

According to example embodiments of the present invention, the operation of the pressure-wave supercharger is adjusted to the instantaneous operating state of the internal combustion engine. This being the case, example embodiments of the present invention represent a departure from the current rigid, and substantially noncontrolled or nonregulated operation of pressure-wave superchargers. Because of the adjustment of the operation of the pressure-wave supercharger to the actual operating state of the internal combustion engine overall, pumping losses of the internal combustion engine are minimized, for example. The responsiveness of the pressure-wave supercharger can also be improved in this manner, and the conditions for an exhaust gas aftertreatment can be optimized.

Housing misalignment or offset is a possibility as an operating parameter of the pressure-wave supercharger that is to be controlled or regulated, for example. By this, one should understand the position of a charge air outlet of an end face of the pressure-wave supercharger relative to the position of an exhaust gas inlet on the other end face of the pressure-wave supercharger. The cold starting response of the internal combustion engine is improved by this, in that, in response to a cold starting of the internal combustion engine, the housing misalignment is reduced.

As the actual operating variable for controlling or regulating the housing misalignment, a thermodynamic state variable, especially a temperature and/or a pressure at least of an intake air is particularly suitable. This is based on the feature that, based on a one-dimensional, linearized model of the gas dynamics, the propagation time of the first shock wave can be calculated and can be compared to the edge geometry of the housing of the pressure-wave supercharger, that is, in the last analysis, compared to the housing misalignment. The "inverse function" of this algorithm leads directly to an open loop regulator, using which the housing misalignment can be regulated. The propagation time of the first shock wave is particularly important, in this context, for the housing misalignment, which, in turn, is greatly dependent on the thermodynamic state of the intake air or fresh air. This thermodynamic state, in turn, in the usual internal combustion engines, can be very simply recorded or ascertained by sensors or even by models.

An additional operating parameter of the pressure-wave supercharger might be a rotary speed of the pressure-wave supercharger. In conventional pressure-wave supercharges, the speed of a rotor of the pressure-wave supercharger is coupled rigidly to the speed of the internal combustion engine. Example embodiments of the present invention deviate from this, for instance, by having the rotor of the pressure-wave supercharger driven by an electric motor. An adjustment of the speed of the pressure-wave supercharger makes possible an improvement in the efficiency, especially at high speeds of the internal combustion engine. In addition, this can improve the scavenging of the pressure-wave supercharger. Such improved scavenging, in turn, leads to improved cooling of the pressure-wave supercharger and especially of its rotor, and also leads to a cell of a rotor being filled again with fresh air at the beginning of a new cycle. In the final analysis, the efficiency of the pressure-wave supercharger is improved, and consequently that of the internal combustion engine as well.

For a given geometry, a thermodynamic state variable of an exhaust gas is particularly suitable as an actual operating variable for controlling or regulating the rotary speed, especially a temperature and/or pressure of the exhaust gas.

One may also consider the setting of a gas pocket inflow valve as an additional operating variable to control or regulate. In conventional turbosuperchargers this corresponds to the waste gate installed into them, by letting exhaust gas flow past the compression in the rotor of the pressure-wave supercharger. The responsiveness of the internal combustion engine is particularly improved by the control or the regulation of the gas pocket inflow valve, in that a sudden drop in torque is avoided, in response to an abrupt change in the load. This is based on the realization that, when a rapid increase in the torque of the internal combustion engine is required, and, as a result, a charge air throttle valve, which is situated between the pressure-wave supercharger and the combustion chambers of the internal combustion engine, is rapidly opened, under certain circumstances the exhaust gas is recirculated, and as a result the torque of the internal combustion engine is adversely affected. This can be avoided by the control or regulation of the gas pocket inflow valve.

The difference between a lambda value of an exhaust gas, flowing from a combustion chamber to the pressure-wave supercharger, and a lambda value of an exhaust gas, flowing off into the environment from the pressure-wave supercharger, is particularly suitable as an actual operating variable for controlling or regulating the setting of the gas pocket inflow valve. For, with the aid of this difference, a scavenging air mass flow can be ascertained. If this does not fall below a certain minimum value, corresponding to a minimum value of the difference between the two lambda values, an exhaust gas recirculation can be excluded or at least minimized, and consequently, a continuous increase in torque can be assured even in the case of a sudden jump in the load. Thus, in the last analysis, the scavenging mass flow is regulated such that it does not fall below a certain minimum value.

However, the problem is that the difference of the two lambda values, that is to be regulated, is afflicted with a delay which would lead to an only time-delayed recirculation in response to rapid transient maneuvers. That is why it is provided that the difference in the lambda values be estimated at least intermittently with the aid of an observer model. A Smith predictor or a Luenberger observer might be considered as the observer.

A simple DT1 element can be used as transfer function between the setting of the gas pocket inflow valve and the difference of the lambda values. This represents a good approximation for the transfer function. This is based on the assumption that an abrupt opening of the charge air throttle valve has a direct effect on the pressure in the charge air channel which leads from the pressure-wave supercharger to the combustion chambers of the internal combustion engine. The pressure difference of the fluid in the charge air channel compared to the pressure in the exhaust gas that flows from the internal combustion engine to the pressure-wave supercharger, is decisive for the depth of penetration of the exhaust gas into the respective cell in the rotor. Subsequently, the pressure rises continuously in the charge air channel that leads from the pressure-wave supercharger to the combustion chambers of the internal combustion engine, as well as that of the exhaust gas channel that leads from the combustion chambers to the pressure-wave supercharger, whereby the degree of scavenging improves again. The actual difference in the two lambda values, that is measured and only ensues at a time delay, is compared to the artificially delayed estimated value, and is input to the observer as an error in the estimate. Consequently, the observer model is implemented, in the last analysis, by the combination of a simple static relationship with a delay element of the first order, which can be done with little programming effort. The closing speed of the gas pocket inflow valve is limited according to the scavenging rate by the regulation, that is, a lower boundary for the scavenging rate is maintained in each case.

An additional operating parameter, that can be controlled or regulated, is the setting of an intake throttle valve that is situated in an intake channel between the environment and the pressure-wave supercharger. The scavenging rate introduced above can be bounded in the upward direction by the intake throttle valve. In other words: The scavenging air mass flow is bounded, whereby, in turn, the temperature of the exhaust gas that is flowing out into the environment from the pressure-wave supercharger can be kept high. In a catalytically working exhaust gas aftertreatment system as high as possible a temperature is obtained in this manner, which improves the efficiency of such an exhaust gas aftertreatment system.

The difference between a lambda value of an exhaust gas, flowing from a combustion chamber to the pressure-wave supercharger, and a lambda value of an exhaust gas, flowing off into the environment from the pressure-wave supercharger, is at least indirectly suitable as an actual operating variable for controlling or regulating the setting of the intake throttle valve. This difference in two lambda values, mentioned above in a different connection, permits closing the intake throttle valve just to the point at which a complete scavenging of a cell of the rotor of the pressure-wave supercharger is still just ensured. An unnecessarily high scavenging rate, which would lower the temperature of the exhaust gas flowing out into the environment, is avoided in this manner in a reliable and simple manner.

In the case of an abrupt change in the load, however, the intake throttle valve is immediately fully opened, in order not additionally to obstruct the scavenging during the transient phase. The position change of the charge air throttle valve can be used for the detection of such a transient phase, or rather, of such an abrupt change in the load. If it is greater than a boundary value, the intake throttle valve is fully opened. The charge air channel is a channel that leads from the pressure-wave supercharger to the combustion chambers of the internal combustion engine. The exhaust gas channel is a channel leading from the combustion chambers of the internal combustion engine to the pressure-wave supercharger. A precontrol of the setting of the intake throttle valve as a function of gradients of a setpoint load is also possible, if necessary.

In addition, the setting of the intake throttle valve is also able to depend on a temperature of the exhaust gas flowing out into the environment from the pressure-wave supercharger.

Example embodiments of the present invention are described in more detail below with reference to the appended Figures.

DETAILED DESCRIPTION

Figure 1:
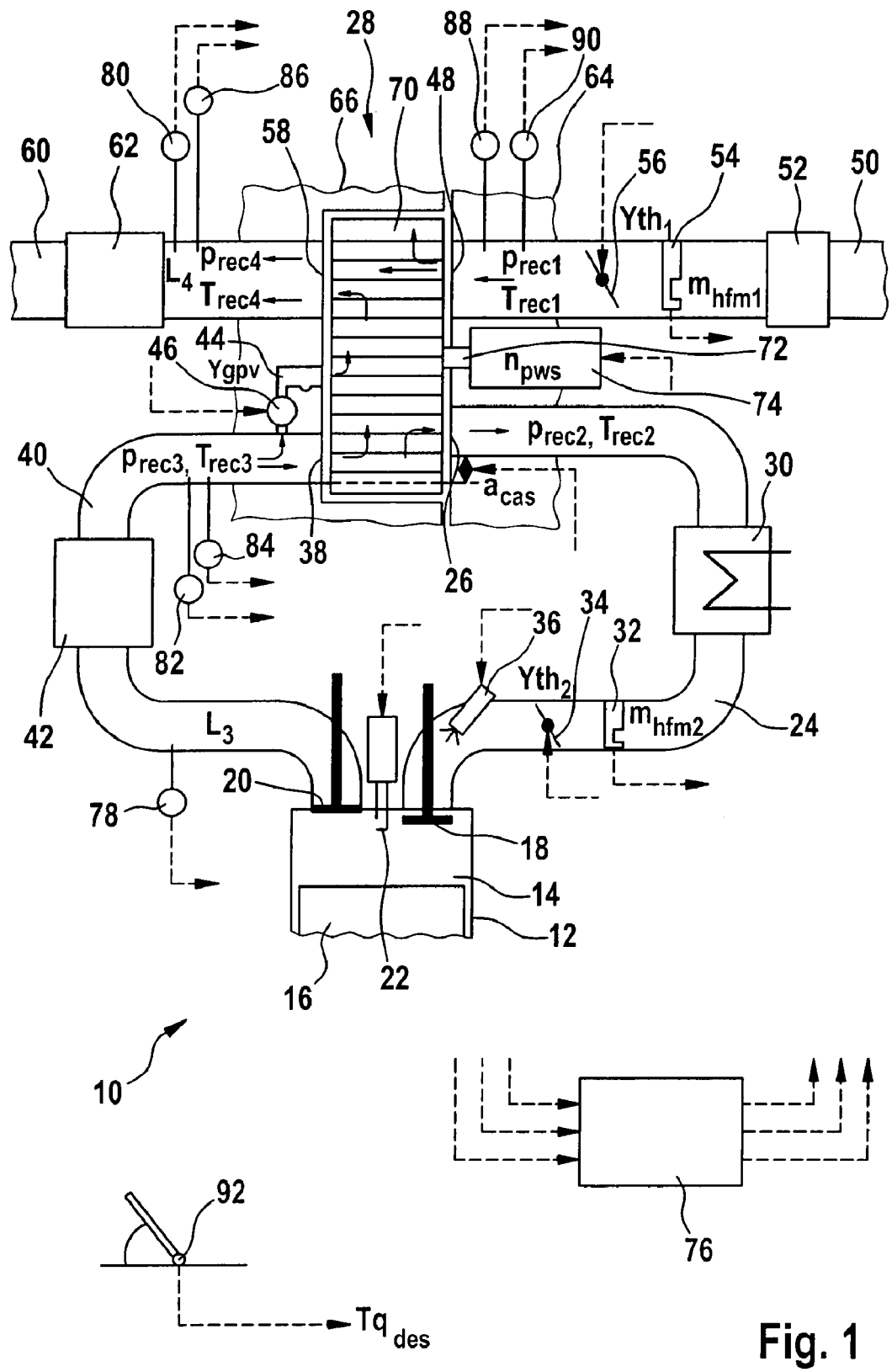
FIG. 1 is a schematic view of an internal combustion engine having a pressure-wave supercharger.

In FIG. 1, an internal combustion engine overall bears reference numeral 10. It is used for driving a motor vehicle and includes a plurality of cylinders, of which only one is illustrated in FIG. 1, having reference numeral 12. It includes a combustion chamber 14, which is bordered by a piston 16, among other things. Cylinder 12 has an intake valve 18, an exhaust valve 20 and a spark plug 22. Internal combustion engine 10 shown in FIG. 1 is a gasoline engine, it being pointed out specifically that most of the following statements may also be applied analogously to Diesel engines.

Air reaches combustion chamber 14 via a charge air channel 24, which connects a charge air outlet 26 of a pressure-wave supercharger 28 to an intake valve 18. In charge air channel 24 there is, as seen in the flow direction, a charge air cooler 30, after that there is a first HFM sensor 32 for recording the air mass flowing through charge air channel 24, then there is a charge air throttle valve 34, and furthermore, a fuel injector 36.

An exhaust gas channel 40 leads from exhaust valve 20 to an exhaust gas intake 38 of pressure-wave supercharger 28. In it there is situated a three-way catalytic converter. A gas pocket channel 40 branches off from exhaust gas channel 40 towards pressure-wave supercharger 28, and in it there is a gas pocket inflow valve 46.

Fresh air reaches a fresh air intake 48 of pressure-wave supercharger 28 via an intake channel 50. In the latter, as seen in the flow direction, there is an air filter 52, a second HFM sensor 54 and an intake throttle valve 56. From an exhaust outlet 58 of pressure-wave supercharger 28, an outlet channel 60 leads into the environment via an oxidation catalyst 62.

Charge air outlet 26 and fresh air intake 48 are part of a housing 64 of pressure-wave supercharger 28, on the air side. Exhaust gas intake 38 and exhaust gas outlet 58 are part of a housing 66 of pressure-wave supercharger 28, on the exhaust gas side. Housing 64 on the air side and housing 66 on the exhaust gas side are able to be adjusted relatively to each other, coaxially with the axis of rotation of a rotor 68. The relative position of the two housings 64 and 66 is also designated as housing misalignment $a_{cas}$. Between the two housings 64 and 66 there is situated rotor 68, in which there is a multitude of channels 70 that extend parallel to the axis of rotation of rotor 68, and are also designated as cells. The rotor is rotatably supported on a shaft 72, which can be set into rotation by an electric motor 74. The rotary speed of rotor 68 is designated by $n_{pws}$.

The operation of internal combustion engine 10 using pressure-wave supercharger 28 is controlled and regulated by a control and regulating device 76. For this, the latter receives signals from various sensors, for instance, from the two HFM sensors 32 and 54, from a lambda sensor 78 which records a lambda value $L_3$ of the exhaust gas flowing in exhaust gas channel 40, from a lambda sensor 80 which records which records a lambda value $L_4$ of the exhaust gas flowing in outlet channel 60, from a pressure sensor 82 which records a pressure $p_{rec3}$ in exhaust gas channel 40, from a temperature sensor 84 which records a temperature $T_{rec3}$ in exhaust gas channel 40, from a temperature sensor 86, which records a temperature $T_{rec4}$ in outlet channel 60, from a pressure sensor 88, which records a pressure $p_{rec1}$ in intake channel 50 and from a temperature sensor 90, which records a temperature $T_{rec1}$ in intake channel 50. Each of the lambda sensors 78 and 80 may provide information on the air/fuel ratio of the engine. At least some of the above-named variables can also be ascertained with the aid of models, in order to save using sensors.

In addition, control and regulation device 76 receives signals from an accelerator sensor 92, by which a driver of the motor vehicle driven by internal combustion engine 10 is able to specify a setpoint load $Tq_{setpoint}$. Various actuators are activated by control and regulation device 76, for instance, spark plug 22 and fuel injector 36.

Furthermore, control and regulation device 76 influences the setting $y_{th1}$ of intake throttle valve 56, a setting $y_{th2}$ of charge air throttle valve 34, a setting $y_{gpv}$ of gas pocket inflow valve 46, rotary speed $n_{pws}$ of electric motor 74 and housing misalignment $a_{cas}$. The control and the regulation by control and regulation device 76 takes place using a computer program, which is stored on an electrical storage medium of control and regulation device 76, and by which certain method steps are processed.

Figure 2:
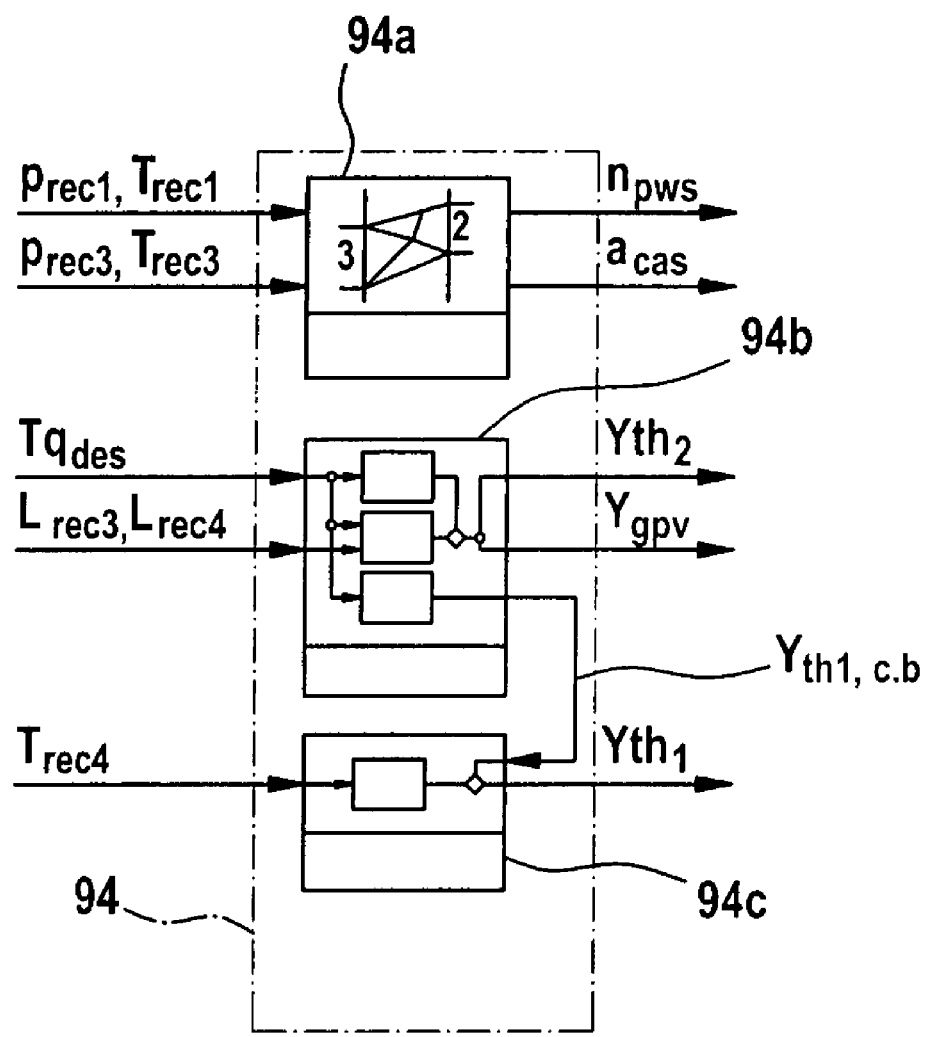
FIG. 2 is a basic representation of a regulator for regulating operating parameters of the pressure-wave supercharger illustrated in FIG. 1.

Because of this computer program, a closed-loop control structure (reference numeral 94 in FIG. 2) is created, which, in turn, includes three substructures 94a, 94b and 94c. Closed-loop control structure 94a is used to regulate speed $n_{wps}$ of electric motor 74, and thus of rotor 68 of pressure-wave supercharger 28 as well as housing misalignment $a_{cas}$. Closed-loop control structure 94a receives as input variables the pressure $p_{rec1}$ prevailing in intake channel 50, or rather, the fresh air flowing there, and temperature $T_{rec1}$ prevailing there, as well as temperature $T_{rec3}$ prevailing in exhaust gas channel 40, or rather, the exhaust gas flowing there, and pressure $p_{rec3}$ prevailing there.

Second closed-loop control structure 94b is used, in the last analysis, for regulating setting $y_{gpv}$, of gas pocket inflow valve 46, as well as for regulating the setting $y_{th2}$ of charge air throttle valve 34. For this, closed-loop control structure 94b receives as input variables load $Tq_{des}$ as well as the two lambda values $L_{rec3}$ and $L_{rec4}$ in exhaust gas channel 40 and in outlet channel 60. Closed-loop control structure 94c is used for regulating setting $y_{th1}$ of intake throttle valve 56. For this, closed-loop control structure 94c receives as input variable temperature $T_{rec4}$ in outlet channel 60, as well as from closed-loop control structure 94b a variable $y_{th1,c,b}$.

Figure 3:
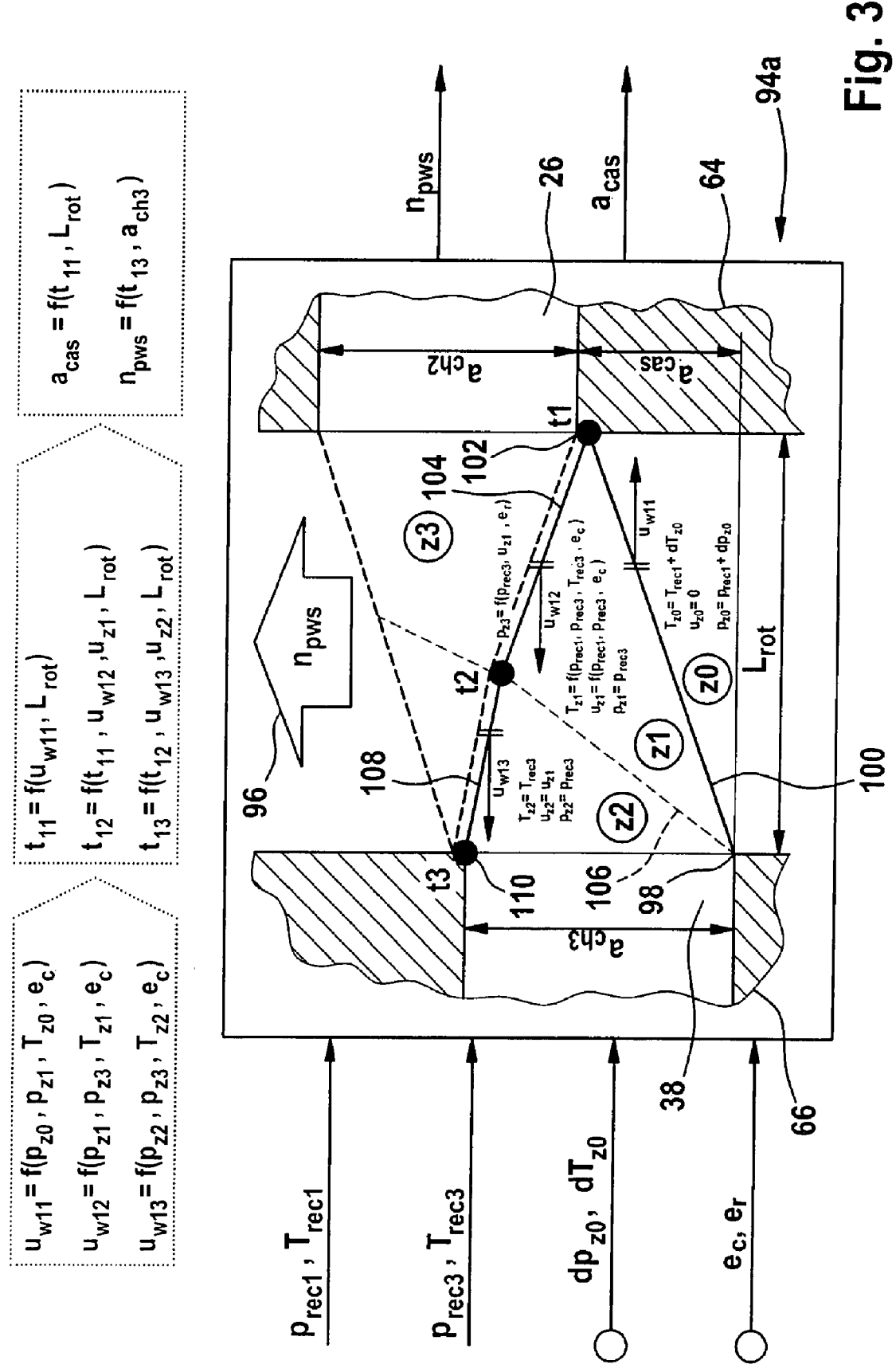
FIG. 3 is a basic representation of thermodynamic actual operating variables of the pressure-wave supercharger illustrated in FIG. 1, for regulating a rotary speed and a housing misalignment.

Closed-loop control structure 94a is based on the following physical relationships (compare FIG. 3). As soon as cell 70 sweeps over an edge 98 of exhaust gas inlet 38, because of the rotation of rotor 68 (direction of rotation=arrow 96 in FIG. 3), a pressure wave 100 is created which spreads out towards housing 64 on the air side. In a zone z0, that is as yet not influenced by pressure wave 100, there prevails a temperature $T_{z0}$ and a pressure $p_{z0}$. A speed $u_{z0}$ of the air enclosed there is 0. Temperature $T_{z0}$ comes about from temperature $T_{rec1}$ in intake channel 50 and pressure $p_{rec1}$ prevailing there, plus a corresponding temperature difference $dT_{z0}$ and a corresponding pressure difference $dp_{z0}$. The speed at which pressure wave 100 propagates is designated as $u_{w11}$.

Pressure wave 100, if possible, hits an edge 102 of charge air discharge 26 of charge air channel 24, namely, after a time t1. From there, the pressure wave is reflected (reference numeral 104), namely, at a speed $u_{w12}$. A border 106 shown by a broken line, which separates exhaust gas on the left side from fresh air on the right side, is reached by pressure wave 104 after a time $t_2$. After running through border 106, the pressure wave is designated as 108. At time $t_3$, it may hit, in turn, an edge 110 of exhaust gas inlet 38.

In a zone z1, which is bordered by pressure wave 100, pressure wave 104 and border 106, a temperature $T_{z1}$ prevails which is a function of pressure $p_{rec1}$ in intake channel 50, of pressure $p_{rec3}$ and of temperature $T_{rec3}$ in exhaust gas channel 40 and of a compression efficiency $e_c$. Pressure $p_{z1}$ in zone z1 corresponds to pressure $p_{rec3}$ in exhaust gas channel 40. Speed $u_{z1}$ of the fresh air in zone z1 is a function of pressure $p_{rec1}$ in intake channel 50, of pressure $p_{rec3}$ in exhaust gas channel 40, and again of compression efficiency $e_c$ via shock waves 100, 104 and 108. A zone z2 is bordered by exhaust gas inlet 38, border 106 and pressure wave 108. Temperature $T_{z2}$ and pressure $p_{z2}$ correspond to temperature $T_{rec3}$ and pressure $p_{rec3}$ in exhaust gas channel 40. Speed $u_{z2}$ of the exhaust gas in zone z2 corresponds to speed $u_{z1}$ of the fresh air on zone z1. A zone z2 is bordered by charge air outlet 26, pressure wave 104 and border 106. The pressure prevailing there, $p_{z3}$, is a function of pressure $p_{rec3}$ in exhaust gas channel 40, of speed $u_{z1}$ and of an efficiency $e_r$ at the reflection of first pressure wave 100.

Based on a simplified thermodynamic model, running times t1, t2 and t3 of pressure waves 100, 104 and 108 are calculated and are compared to edge geometries $a_{ch2}$ of charge air outlet 26 and $a_{ch3}$ of exhaust gas inlet 38. From running time t1 there results directly housing misalignment $a_{cas}$, and from running time t3 and known housing geometries $a_{ch3}$ and $a_{ch2}$ there results speed $n_{pws}$ of rotor 68.

Figure 4:
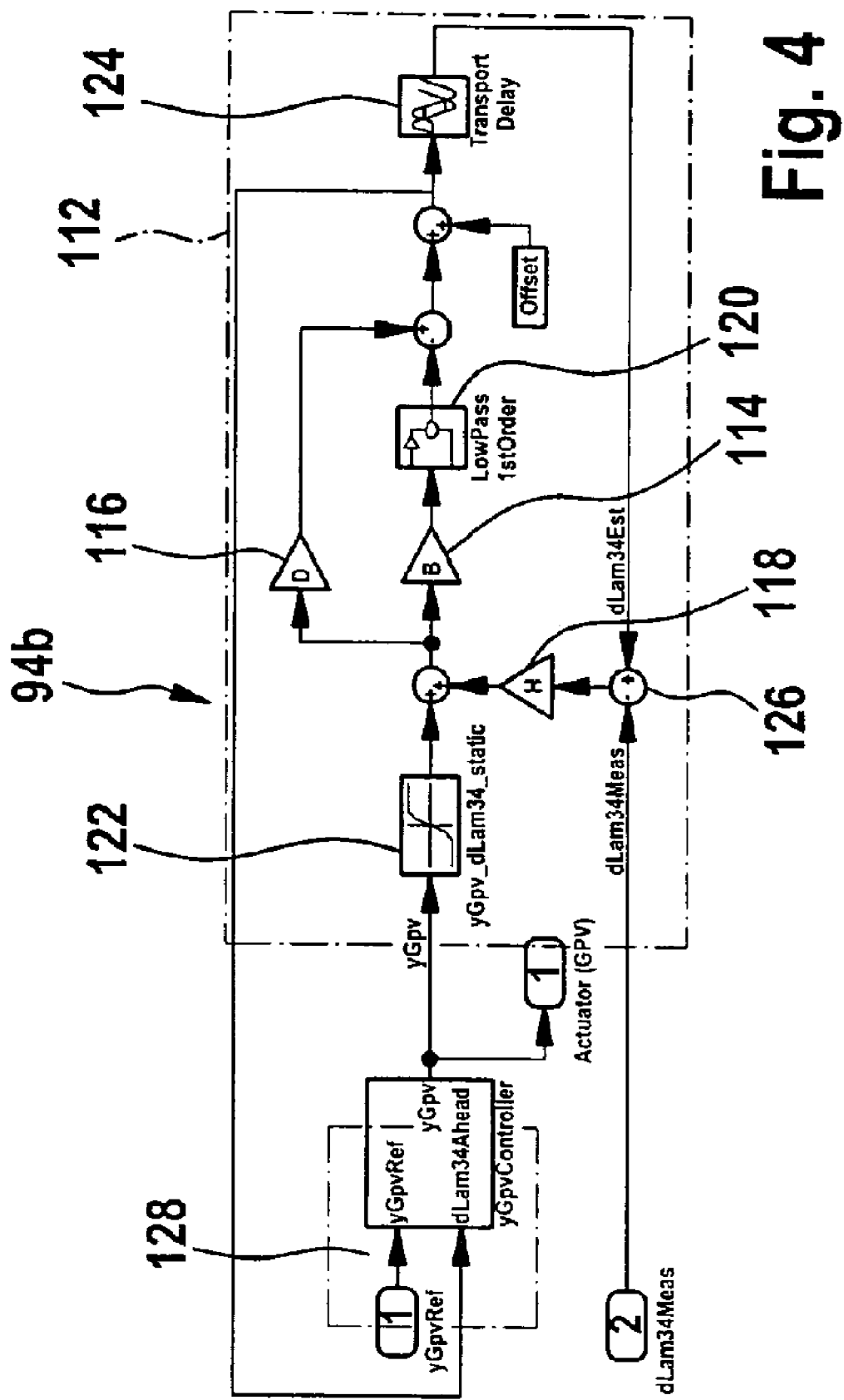
FIG. 4 is a first flow chart of a closed-loop control structure for regulating the setting of a gas pocket inflow valve of the pressure-wave supercharger illustrated in FIG. 1.
Figure 5:
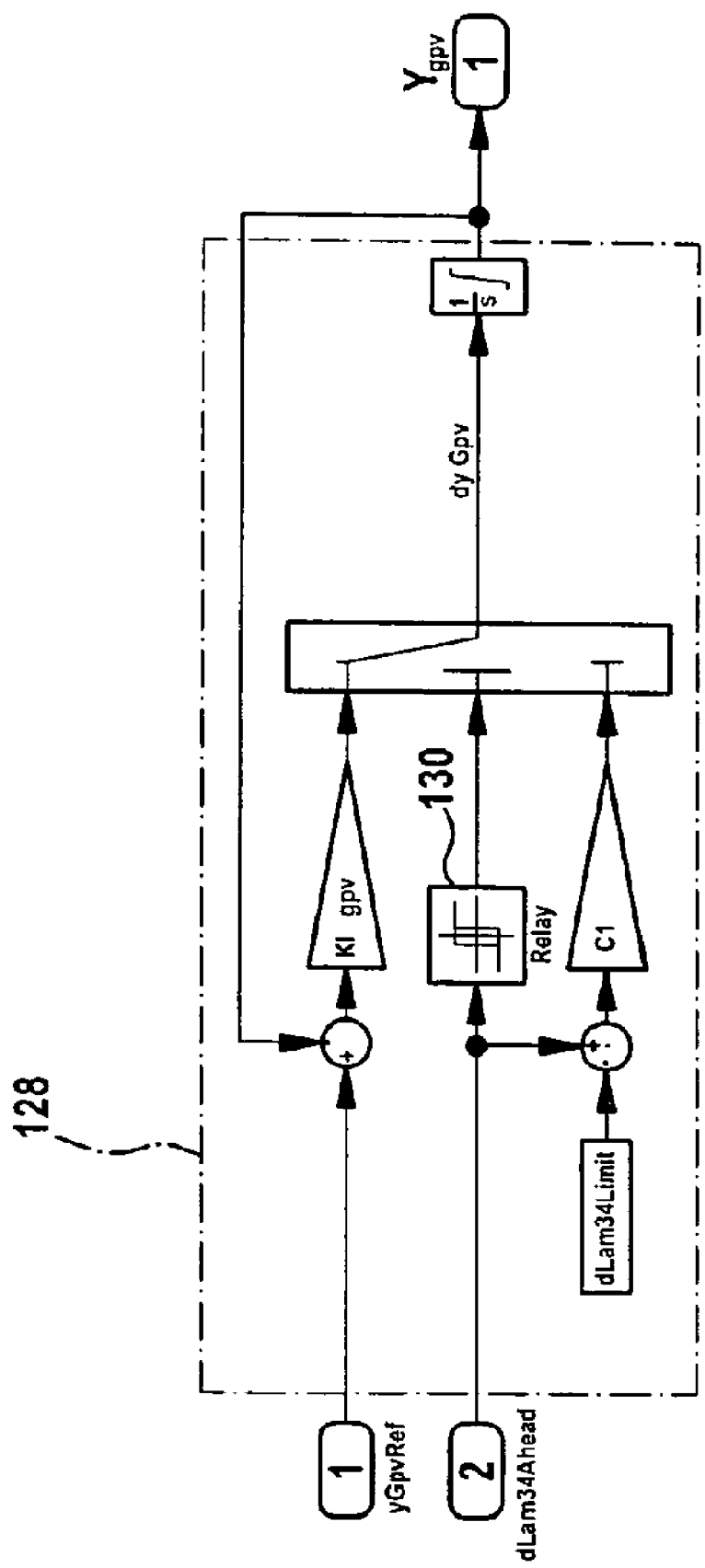
FIG. 5 is a second flow chart of the closed-loop control structure for regulating the setting of the gas pocket inflow valve.

Closed-loop control structure 94b are explained more thoroughly, in connection with FIGS. 4 and 5. Conditioned upon the nature of pressure-wave supercharger 28, air and exhaust gas are in direct contact in cells 70 of rotor 68, indeed, they even mix with each other partially. In particular, in response to very rapid closing of gas pocket inflow valve 46, it was able to happen, up to now, that exhaust gas reached combustion chamber 14 via charge air channel 24, which was able to lead to a temporary slump in torque. In order to prevent this phenomenon referred to as transient exhaust gas recirculation, in the present instance, closed-loop control structure 94b is used.

It is recognized, in this context, that it is not meaningful to measure the recirculated exhaust gas in charge air channel 24. The reason is that when it is found that there is such recirculated exhaust gas in charge air channel 24, it is already too late, because the detected exhaust gas then gets into combustion chamber 14, and leads to a sudden drop in torque. Therefore, in the present instance, a scavenging air mass flow is used for regulating the setting $y_{gpv}$ of gas pocket inflow valve 46. This is a fresh air stream that arrives in outlet channel 60 directly from intake channel 50, and mixes there with the exhaust gas originating from exhaust gas channel 40. The scavenging air mass flow can therewith be exactly calculated in a stationary manner from lambda values $L_3$ and $L_4$ in exhaust gas channel 40 and in outlet channel 60. The quotient of the scavenging mass flow and the mass flow flowing to charge air channel 24 is designated as the scavenging rate. The scavenging rate, in turn, is yielded by the difference $dLam_{34}$ of the two lambda values $L_3$ and $L_4$ divided by the lambda value $L_3$. A continuous torque increase can be ensured if a minimum value of the difference $dLam_{34}$ is not undershot.

However, the measurement of the difference $dLam_{34}$ is afflicted with a delay, that is, the corresponding value dLam34Meas limps behind the real circumstances. In the case of a transient abrupt change in load, that is, when charge air throttle valve 34 and gas pocket inflow valve 46 are opened rapidly, the information about the difference of the lambda values would actually arrive too late. Therefore, in the present instance, the difference is estimated by an observer model L, for instance, a Smith predictor. The estimated value dLam34Est or dLam34Ahead is then used as the basis for an actual controller block.

In FIG. 4, the structure of the observer model is designated as 112. 114, 116 and 118 are scalar amplification factors. 120 designates a low pass element or DT1 element of the first order. For, it is established that the transfer function from setting $y_{gpv}$ of gas pocket inflow valve 46 to the value dLam34 can be approached with good approximation by such a DT1 element 120. It is assumed, in this case, that the influence of the abrupt opening of charge air throttle valve 34 directly affects pressure $p_{rec2}$ in charge air channel 24, and that the mass flow from cells 70 into charge air channel 24 increases, whereby pressure $p_{rec2}$ in charge air channel 24 and pressure $p_{rec3}$ in exhaust gas channel 40 rise continuously and increase the scavenging.

Block 122 designates a static relationship, for instance, in the form of a table, between the current setting $y_{Gpv}$ of gas pocket inflow valve 46 and the dLam34 value resulting from it. Block 124 designates a time delay. In observer 112, a value dLam34Est is estimated based on current setting yGpv of gas pocket inflow valve 46. The artificially time-delayed value dLam34Est is compared to actually measured value dLam34Meas (reference numeral 126). The value yielded by this is amplified and fed back using scalar amplification factor 118, so that the error of the estimate is minimized.

The actual closed loop control structure is shown in FIG. 4, designated by 128, and is shown in FIG. 5 in detail. For the input value, there is used first of all a setpoint value yGpvRef for the setting of gas pocket inflow valve 46. The latter is calculated from torque $Tq_{des}$ requested by the user and the current speed of internal combustion engine 10. Closed-loop control structure 128 also receives estimated value dLam34Ahead that is not time delayed, which is furnished by observer 112. Signal $y_{gpv}$ forms the output of controller 128.

In this context, this is the signal actually sent to the actuator of gas pocket inflow valve 46. The control rule for controller 128 is: As long as dLam34Ahead remains above a certain threshold dLam34Limit, that is, as long as the scavenging mass flow is sufficient, the actuator value $y_{gpv}$ is corrected to the setpoint value yGpvRef. However, if the value dLam34Ahead falls below the value stored in block 130, a gradient dyGpv of the setting $y_{gpv}$ of gas pocket inflow valve 46 is limited, namely, according to the difference of the estimated value dLam34Ahead from lower limit dLam34Limit. The closer the value dLam34Ahead approaches lower limit dLam34Limit, that is, the more critical the scavenging mass flow becomes, the slower gas pocket inflow valve 46 closes.

Closed-loop control structure 94c, in turn, functions in the following manner: As a function of the degree of scavenging, or rather again as a function of the magnitude dLam34, intake throttle valve 56 is closed so far that a complete scavenging of cells 70 of rotor 68 is still just ensured. If, however, the desired load suddenly changes, that is, if charge air throttle valve 34 is suddenly opened, intake throttle valve 56 is at once opened completely, so as not to additionally hinder the scavenging, or rather to achieve the best possible scavenging conditions during this transient phase, especially as long as the condition applies that the difference in the pressures $p_{rec2}$ and $p_{rec3}$ is clearly greater than zero.

What is claimed is:

1. A method for operating a pressure-wave supercharger, the method comprising:
   compressing fresh air with the pressure-wave supercharger, the pressure-wave supercharger including at least two channels, an exhaust gas channel and a charge air channel, a misalignment of the exhaust gas channel and the charge air channel being adjustable;
   determining at least one thermodynamic state variable;
   determining the misalignment of the exhaust gas channel and the charge air channel based at least in part on the at least one thermodynamic state variable; and
   adjusting the misalignment of the exhaust gas channel and the charge air channel based at least in part on the determining of the misalignment, wherein the determining at least one thermodynamic state variable is based at least in part on a time between a pressure-wave moving from one side of the pressure-wave supercharger to an opposing side of the pressure-wave supercharger.

2. The method of claim 1, further comprising:
   adjusting a rotational speed of a rotational element based at least in part on the at least one thermodynamic state variable;
   wherein the pressure-wave supercharger includes the rotational element for compressing air.

3. A computer readable medium having stored thereon instructions executable by a processor, the instructions which, when executed by the processor, cause the processor to perform a method for operating an internal combustion engine, in which fresh air is compressed with a pressure-wave supercharger, the pressure-wave supercharger including at least two channels, an exhaust gas channel and a charge air channel, a misalignment of the exhaust gas channel and the charge air channel being adjustable, the method comprising:
   determining at least one thermodynamic state variable;
   determining the misalignment of the exhaust gas channel and the charge air channel based at least in part on the at least one thermodynamic state variable; and
   adjusting the misalignment of the exhaust gas channel and the charge air channel based at least in part on the determining of the misalignment;

wherein:
- the exhaust gas channel connects a cylinder to the pressure-wave supercharger;
- an outlet channel is connected to the pressure-wave supercharger;
- a gas pocket channel is connected to the exhaust gas channel to the pressure-wave supercharger;
- the gas pocket channel includes a gas pocket inflow valve for increasing and decreasing gas flow through the gas pocket channel;
- a first lambda value associated with the exhaust gas channel and a second lambda value associated with the outlet channel are determined;
- a difference between the first and the second lambda values is determined; and
- the gas pocket inflow valve is adjusted based at least in part on the difference.

* * * * *